(12) United States Patent
Hashimoto et al.

(10) Patent No.: US 7,433,126 B2
(45) Date of Patent: Oct. 7, 2008

(54) ILLUMINATING OPTICAL DEVICE IN IMAGE DISPLAY DEVICE AND IMAGE DISPLAY DEVICE

(75) Inventors: Shigeki Hashimoto, Tokyo (JP); Hiroki Kikuchi, Kanagawa (JP); Michio Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/489,152

(22) PCT Filed: Jul. 2, 2003

(86) PCT No.: PCT/JP03/08404

§ 371 (c)(1),
(2), (4) Date: Mar. 10, 2004

(87) PCT Pub. No.: WO2004/008225

PCT Pub. Date: Jan. 22, 2004

(65) Prior Publication Data

US 2004/0257664 A1 Dec. 23, 2004

(30) Foreign Application Priority Data

Jul. 11, 2002 (JP) ............................. 2002-202176

(51) Int. Cl.
*G02B 27/00* (2006.01)
*G02B 27/10* (2006.01)
*G02B 26/00* (2006.01)
(52) U.S. Cl. .................. 359/577; 359/618; 359/237
(58) Field of Classification Search ................. 359/572, 359/577, 636, 618, 627, 707, 237; 385/115, 385/116, 33; 362/552, 553; 372/93, 25, 372/108, 26
See application file for complete search history.

(56) References Cited

U.S. PATENT DOCUMENTS

| 5,343,489 | A | * | 8/1994 | Wangler | 372/93 |
| 5,982,553 | A | * | 11/1999 | Bloom et al. | 359/627 |
| 6,249,381 | B1 | * | 6/2001 | Suganuma | 359/618 |
| 6,470,122 | B1 | * | 10/2002 | Doumuki | 385/115 |
| 6,594,090 | B2 | * | 7/2003 | Kruschwitz et al. | 359/707 |
| 6,611,382 | B2 | * | 8/2003 | Hashimoto | 359/619 |
| 6,765,934 | B2 | * | 7/2004 | Gross | 372/25 |
| 6,829,440 | B2 | * | 12/2004 | Ooi et al. | 398/148 |
| 6,897,992 | B2 | * | 5/2005 | Kikuchi | 359/237 |

FOREIGN PATENT DOCUMENTS

| EP | 0959378 A1 | 11/1999 |
| EP | 1193525 A2 | 4/2002 |
| JP | 63-027814 | 2/1988 |

(Continued)

*Primary Examiner*—Audrey Y Chang
(74) *Attorney, Agent, or Firm*—Wolf, Greenfield & Sacks, P.C.

(57) ABSTRACT

Speckle noise is reduced to increase image quality in an image display apparatus such as a projection display or the like.

An illuminating optical device in an image display apparatus (1) applies a laser beam L to a GLV (spatial modulator) (6) and modulates the laser beam based on an image signal input to the GLV to display an image. A plurality of laser beams (1, 1, . . . ) each having an optical path difference greater than the coherence length of the laser beam are applied to the GLV.

18 Claims, 7 Drawing Sheets

FOREIGN PATENT DOCUMENTS

| | | |
|---|---|---|
| JP | 63211624 | 9/1988 |
| JP | 01-266506 | 10/1989 |
| JP | 05-188339 | 7/1993 |
| JP | 2001-296482 | 10/2001 |
| JP | 2002-023070 | 1/2002 |
| JP | 2002-162573 | 6/2002 |
| JP | 2002-162599 | 6/2002 |

* cited by examiner

ILLUMINATING OPTICAL DEVICE IN IMAGE DISPLAY DEVICE AND IMAGE DISPLAY DEVICE

TECHNICAL FIELD

The present invention relates to an illuminating optical device in an image display apparatus for displaying an image with light that has been modulated by a spatial modulator, and an image display apparatus. More specifically, the present invention is concerned with a technique for improving the quality of an image.

BACKGROUND ART

Heretofore, there has been proposed as a form of an image display apparatus a liquid crystal panel or a projection display for applying a light beam modulated by a spatial modulator such as a DMD (Digital Micromirror Device) or the like to display an image on a screen. Such a projection display has employed a lamp such as a metal halide lamp, a halogen lamp, or a xenon lamp as a light source.

However, in the case where those lamps are used as a light source, there is a problem that they have a short life and need complex maintenance. Another problem is that an optical system for extracting three primary colors from white light emitted from the lamp is complicated, and a color reproduction range is limited, resulting in reduced light utilization efficiency.

For solving the above problems, attempts have been made to use a laser beam source such as a semiconductor laser or the like as the light source of a projection display. The laser beam source has many advantages in that it has a longer service life than lamps, an excellent directivity for efficient utilization of radiated light, thus providing a high light utilization efficiency, and has a wide color reproduction range because of its monochromatic nature.

In recent years, a display employing an active-drive grating (diffraction grating) fabricated by the micromachining technology has been developed and drawing attention. The diffraction grating device that is employed is called "grating light valve" (hereinafter referred to as "GLV"). The display has such features that it can display seamless, clear, and bright images compared with the conventional display using a spatial modulator, can be manufactured inexpensively by the micromachining technology, and can operate at a high speed.

It has been considered to use a laser beam source such as a semiconductor laser or the like as a light source for illuminating a GLV.

However, if a laser beam source is used as the light source of an image display apparatus such as a projection display or the like as described above, then speckles (or speckle noise) are generated, degrading the image quality.

The speckle noise is a phenomenon caused when coherent light emitted in uniform phase from a laser beam source is dispersed by a random phase surface (object surface), and disturbed wavefronts propagated from adjacent regions on the object surface interfere with each other on an observation surface. The speckle noise appears as a granular intensity distribution on the observation surface.

If such speckle noise occurs between the screen as the object surface of the projection display with the laser beam source and the observer's eye (retina) as the observation surface, then the observer recognizes the speckle noise as image degradation. It is therefore important to reduce speckle noise for image display apparatus such as a projection display with a laser beam source.

If an image display apparatus such as a projection display or the like employs a laser beam of low spatial coherence, it may be able to produce a two-dimensional image having reduced speckle noise. However, since a laser beam of low spatial coherence tends to cause noise and the beam shape and intensity distribution thereof are liable to vary and hence unstable, it is not suitable for use as a light source in an image display apparatus such as a projection display or the like.

A high-output visible laser beam whose beam shape and intensity distribution are stable is generally of high spatial coherence, and tends to cause the above problem of speckle noise.

It is therefore an object of the present invention to reduce speckle noise to lower image degradations in an image display apparatus such as a projection display or the like.

DISCLOSURE OF THE INVENTION

An illuminating optical device in an image display apparatus according to the present invention, which applies a laser beam to a spatial modulator and modulates the laser beam based on an image signal input to the spatial modulator to display an image, resides in that a plurality of laser beams each having an optical path difference greater than the coherence length of the laser beam are applied to the spatial modulator.

An image display apparatus according to the present invention, which applies a laser beam to a spatial modulator and modulates the laser beam based on an image signal input to the spatial modulator to display an image, resides in that an illuminating optical device for applying a laser beam to the spatial modulator applies a plurality of laser beams each having an optical path difference greater than the coherence length of the laser beam to the spatial modulator.

In the illuminating optical device and the image display apparatus according to the present invention, therefore, a plurality of laser beams each having an optical path difference greater than the coherence length of the laser beam are applied to the spatial modulator.

BEST MODE FOR CARRYING OUT THE INVENTION

Figure 1:
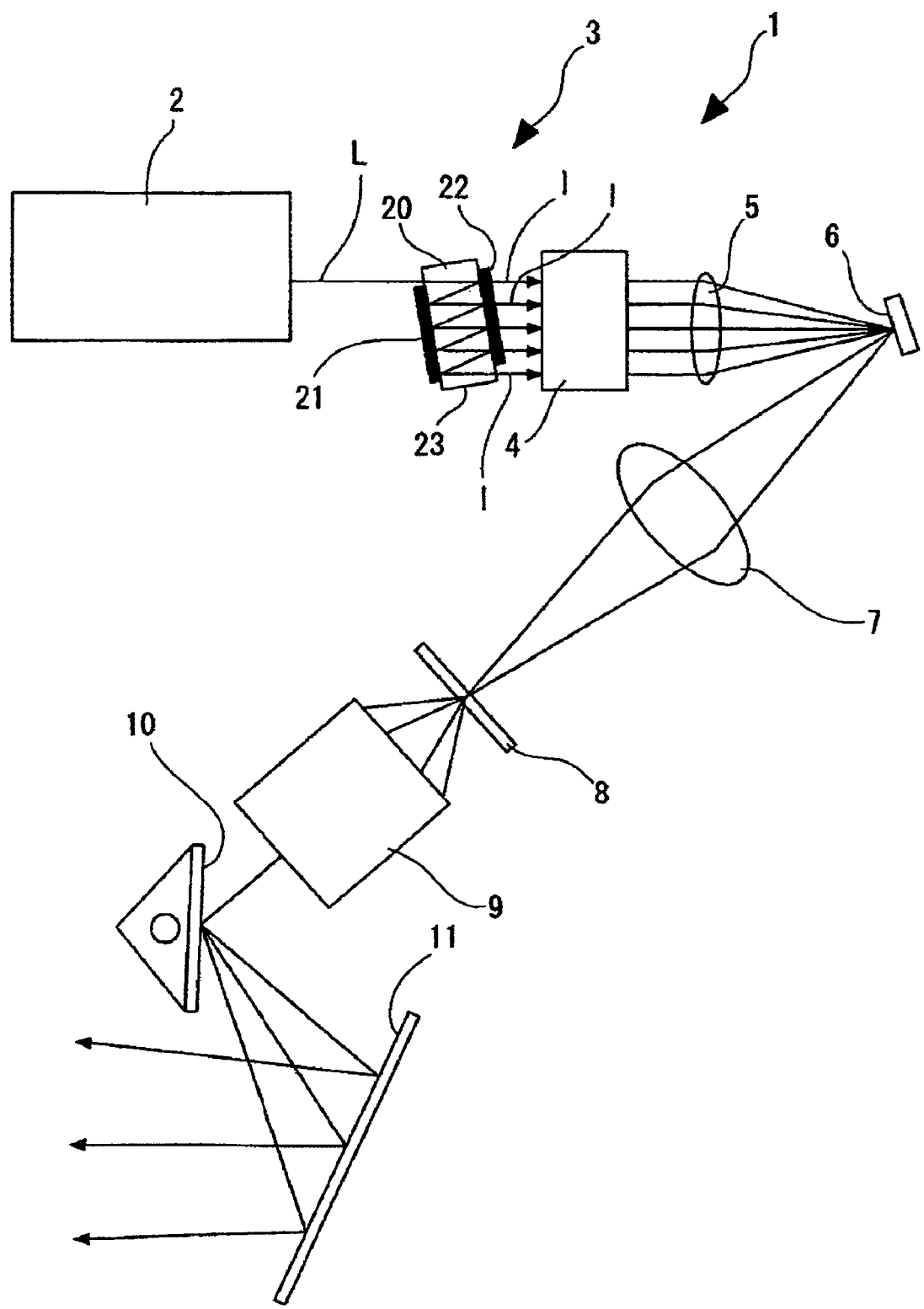
FIG. 1 shows, together with FIGS. 2 through 4, a first embodiment of an illuminating optical device in an image display apparatus according to the present invention and an image display apparatus, FIG. 1 being a schematic view showing the image display apparatus in its entirety.

The present invention relates to an image display apparatus for displaying an image by applying a laser beam to a spatial modulator and modulating the laser beam with an image signal that is input to the spatial modulator, and an illuminating optical device for use in the image display apparatus. The image display apparatus may be a front projection laser display or a rear projection laser display, or may be any of a wide variety of image display apparatus for use in printing and recording applications, e.g., a laser printer, an apparatus for recording images on motion-picture films based on digital image data, etc.

The spatial modulator may include a GLV described above, a liquid crystal, a DMD, or the like.

Embodiments of the present invention will be described below with reference to the accompanying drawings.

FIGS. 1 through 4 show a first embodiment of the present invention, which is applied to an illuminating optical device in an image display apparatus using a GLV as a spatial modulator, and an image display apparatus.

First, an image display apparatus 1 will briefly be described below.

The image display apparatus 1 has a laser beam source 2 for emitting a laser beam L, an optical system (hereinafter referred to as "separating optical system") 3 for separating the laser beam L emitted from the laser beam source 2 into a plurality of laser beams, a line generator/expander optical system 4 for uniformizing an intensity distribution of the laser beams l, l, . . . separated by the separating optical system 3 and shaping the beam configuration of the laser beams l, l, . . . into a line, a focusing lens 5 for focusing the laser beams l, l, . . . shaped by the line generator/expander optical system 4 into one spot (one line) on a one-dimensional spatial modulator, a GLV 6 for generating ±first-order diffracted light ±Lo1 and performing one-dimensional spatial modulation to form a one-dimensional image, a relay optical system 7 for re-focusing the one-dimensional image formed by the GLV 6, an optical filter (hereinafter referred to as "Schlieren filter") 8 for passing only the ±first-order diffracted light ±Lo1 generated by the GLV 6 and blocking 0th-order light, a projecting lens system 9 for projecting the ±first-order diffracted light ±Lo1 filtered by the Schlieren filter 8, a galvanometer mirror 10 for converting the one-dimensional image into a two-dimensional image, and a screen 11 for displaying the two-dimensional image thereon (see FIG. 1).

For displaying a full-color two-dimensional image, the laser beam source 2 is required to include a laser beam source for emitting a red laser beam, a laser beam source for emitting a green laser beam, and a laser beam source for emitting a blue laser beam.

The laser beam emitted from each of the color laser beam sources has a coherence length in the range from 20 mm to 600 mm. In the present embodiment, the coherence length of the laser beam source 2 will be explained as being of 60 mm, for example.

The laser beam source for emitting a red laser beam (having a wavelength of 642 nm) may be a red laser diode array.

The laser beam source for emitting a green laser beam (having a wavelength of 532 nm) and the laser beam source for emitting a blue laser beam (having a wavelength of 457 nm) may be provided by emitting an output laser beam (having a wavelength of 1064 nm or 914 nm) from a passive Q-switching LD-excited Nd:YVO4 (or Nd:YAG) microchip laser, amplifying the emitted output laser beam with an LD-excited Nd: doped fiber amplifier, and converting the wavelength of the amplified laser beam according to a second harmonic generating process. The laser beam source of the above type is ideal for use as a laser display light source because it has an optical fiber as an amplifying medium that can easily be aligned and is rigid, is capable of emitting a high-output laser beam at a low cost, and can be mass-produced.

Figure 2:
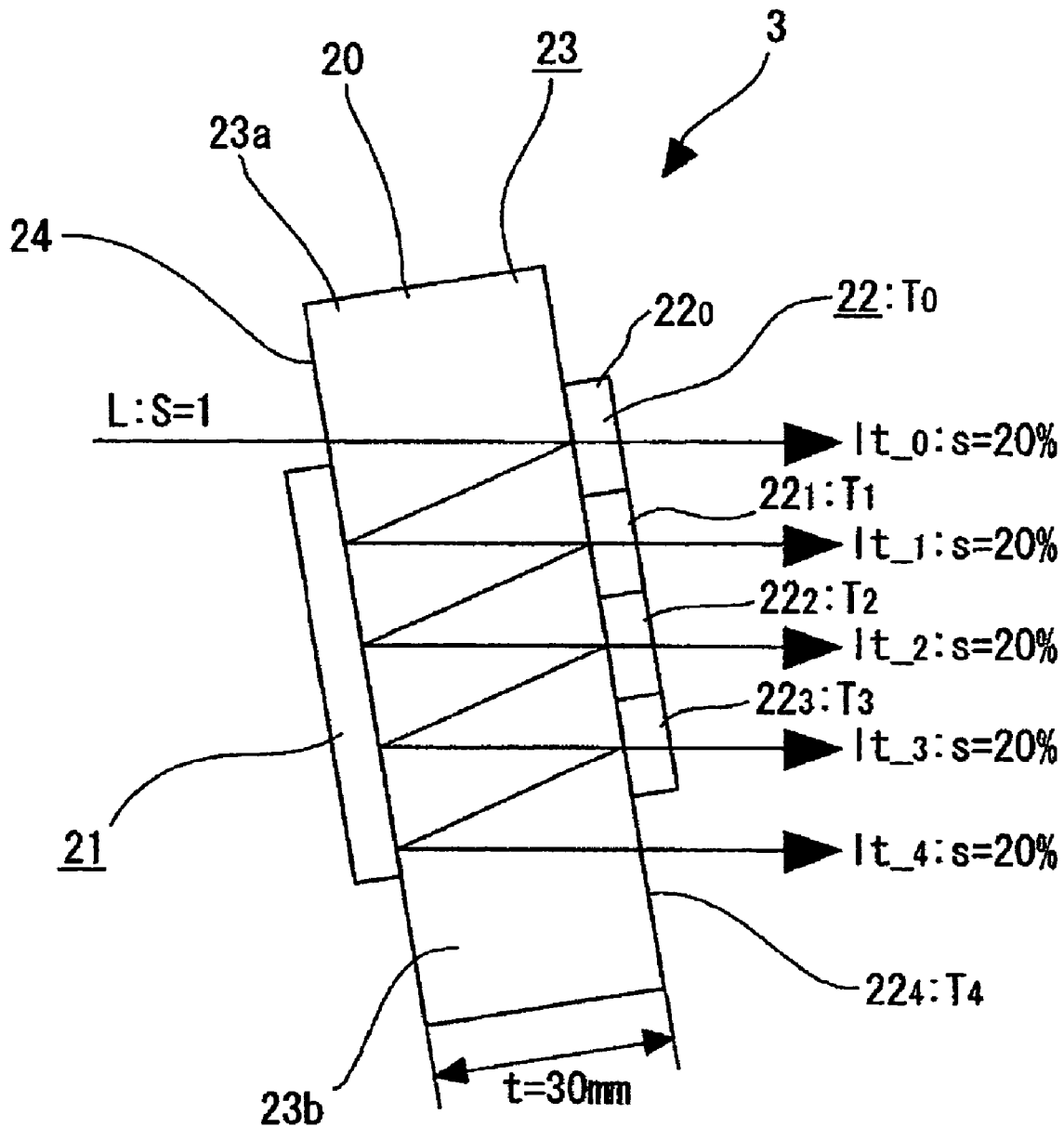
FIG. 2 is a cross-sectional view showing a multiple reflection plate at an enlarged scale.

The separating optical system 3 includes a multiple reflection plate 23 including a parallel flat plate 20 which has confronting parallel surfaces made of a transparent material, with a total reflection surface 21 formed on one of the confronting parallel surfaces and a semi-transmissive reflection surface 22 having a predetermined transmittance formed on the other of the confronting parallel surfaces (see FIGS. 1 and 2).

The multiple reflection plate 23 is disposed such that the total reflection surface 21 is positioned closer to the laser beam source 2. The laser beam L from the laser beam source 2 is applied to an end (hereinafter referred to as "entrance end") 23a (see FIG. 2).

The multiple reflection plate 23 has a thickness t which is ½, for example, of the coherence length (60 mm) of the laser beam L applied thereto, i.e., t=30 mm (see FIG. 2).

The multiple reflection plate 23 is slightly tilted from an orientation in which it would be perpendicular to the optical axis of the laser beam L. The multiple reflection plate 23 is tilted such that an end (hereinafter referred to as "exit end") 23b thereof which is opposite to the entrance end 23a is displaced slightly farther from the laser beam source 2 than the entrance end 23a (see FIG. 2).

The total reflection surface 21 is partly removed near the entrance end 23a, providing an entrance window 24 for the laser beam L (see FIG. 2).

The total reflection surface 21 has a reflectance of 100% on its entire surface (except the entrance window 24). The semi-transmissive reflection surface 22 is divided into a plurality of regions $22_0, 22_1, 22_2, \ldots$ depending on the number of times and the position that the laser beam L undergoes multiple reflections, the regions $22_0, 22_1, 22_2, \ldots$ having respective predetermined transmittances T0, T1, T2, . . . such that light beams emitted from the respective regions $22_0, 22_1, 22_2, \ldots$ have the same intensity s (see FIG. 2).

In the present embodiment, the semi-transmissive reflection surface 22 provides different transmittances (hereinafter represented by "T0, T1, . . . , T4") at respective five divided regions to equalize the intensities s of the light beams emitted therefrom (the illustrated number of divisions is 4 because "T4=100%" as described later) (FIG. 2).

If the intensity S of the laser beam that is applied to the multiple reflection plate 23 is "1", then the intensity s of each of the light beams emitted from the respective regions $22_0, 22_1, \ldots, 22_4$ of the semi-transmissive reflection surface 22 is s=1÷5=0.2.

The illustrated five light beams "lt_n" (n=0, 1 to 4) represent the respective emitted light beams, where the suffix "n" corresponds to the number of reflections on the exit surface (see FIG. 2).

If it is assumed for a simpler explanation that the entrance window 24 causes no intensity loss (a reflectance of 0), then the intensities s of the emitted light beams are represented by the respective transmittances T0, T1, . . . , T4 as follows:

the intensity s of the laser beam indicated by "lt_0" (the laser beam emitted without being reflected by the exist surface)=S×T0=0.2.

the intensity s of the laser beam indicated by "lt_1" (the laser beam emitted after being reflected once by the exist surface)="(1−s)×T1"=0.2.

the intensity s of the laser beam indicated by "lt_2" (the laser beam emitted after being reflected twice by the exist surface)="(1−2s)×T2"=0.2.

the intensity s of the laser beam indicated by "lt_3" (the laser beam emitted after being reflected three times by the exist surface)="(1−3s)×T3"=0.2.

the intensity s of the laser beam indicated by "lt_4" (the laser beam emitted after being reflected four times by the exist surface)="(1−4s)×T4"=0.2.

Therefore, the transmittances $T0, T1, \ldots, T4$ of the respective regions $22_0, 22_1, \ldots, 22_4$ of the semi-transmissive reflection surface 22 are given as follows:

$T0=0.2 \div 1=0.2 \ (=20\%)$ $T1=0.2 \div 0.8=0.25 \ (=25\%)$ $T2=0.2 \div 0.6=0.33 \ (=33\%)$ $T3=0.2 \div 0.4=0.5 \ (=50\%)$ $T4=0.2 \div 0.2=1 \ (=100\%)$ The semi-transmissive reflection surface $22_0$ passes 20% of the intensity of the laser beam L that has been applied from the entrance window 24 of the multiple reflection plate 23, and reflects the remaining 80% toward the total reflection surface 21 (see FIG. 2).

The total reflection surface 21 reflects 100% of the laser beam L toward the semi-transmissive reflection surface $22_1$ (see FIG. 2).

The semi-transmissive reflection surface $22_1$ passes 33% of the applied laser beam L, and reflects the remaining 66% toward the total reflection surface 21 (see FIG. 2).

The emitted light beam lt_1 that has passed through the semi-transmissive reflection surface $22_1$, has its intensity corresponding to approximately 20% of the intensity of the laser beam L which is applied to the multiple reflection plate 23 (see FIG. 2).

Subsequently, the laser beam L is repeatedly reflected within the multiple reflection plate 23, and partly passes through and is emitted from the semi-transmissive reflection surface 22, so that the laser beam L is divided into five emitted light beams lt, lt, . . . having the same intensity (see FIG. 2).

Between the light beams lt, lt, . . . emitted after the laser beam L is reflected within the multiple reflection plate 23, there are developed optical path differences each at least twice the thickness of the multiple reflection plate 23 (see FIG. 2).

Specifically, an optical path difference as large as twice the thickness of the multiple reflection plate 23 is developed between the emitted light beams lt_0, lt_1, between the emitted light beams lt_1, lt_2, . . . , and between the emitted light beams lt_3, lt_4. (see FIG. 2).

In this manner, there is developed an optical path difference equal to or greater than the coherence length of the laser beam L between the emitted light beams lt_0, lt_1, between the emitted light beams lt_1, lt_2, . . . , and between the emitted light beams lt_3, lt_4. Consequently, the five emitted light beams lt_n are not coherent with respect to each other. Therefore, applying the emitted light beams lt, lt, . . . that are adjacent to each other as five laser beams having optical path differences each greater than the coherence length is equivalent to applying light beams from five uncorrelated light sources, with the result that speckle noise can be reduced.

When the five divided laser beams L are applied to the GLV 6, they fall on the GLV 6 at different optical axis angles, producing different speckle patterns for thereby further reducing speckle noise.

In the present embodiment, the laser beam is separated in intensity into five laser beams. However, the number of intensity-separated laser beams is not limited to 5, but the laser beam may be separated into as many laser beams as permitted by the focusing ability (F value) of the optical system within the technical scope of the present invention. Speckle noise can further be reduced by separating the laser beam in intensity into as many laser beams as possible.

The line generator/expander optical system 4 converts and shapes the beam shapes of the laser beams l, l, . . . emitted from the separating optical system 3 into linear beams that are optimum for illuminating the one-dimensional spatial modulator. Generally, the line generator/expander optical system 4 includes a cylindrical lens (see FIG. 1).

The focusing lens 5 is a lens for focusing the linear beams shaped by the line generator/expander optical system 4 onto a one spot on one-dimensional spatial modulator. Generally, the focusing lens 5 includes a cylindrical lens (see FIG. 1).

Figure 3A:
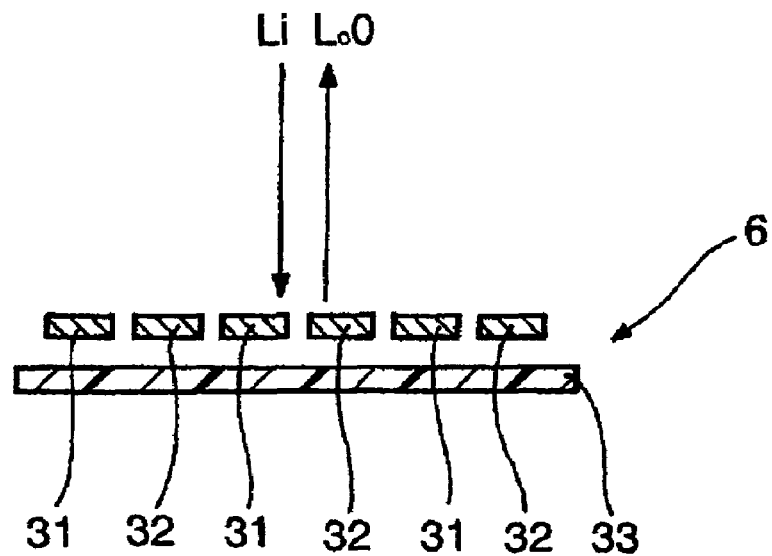
FIGS. 3A and 3B are vertical cross-sectional views illustrative of a grating light valve, FIG. 3A showing the grating light valve in a pixel-off state, and FIG. 3B showing the grating light valve in a pixel-on state.
Figure 3B:
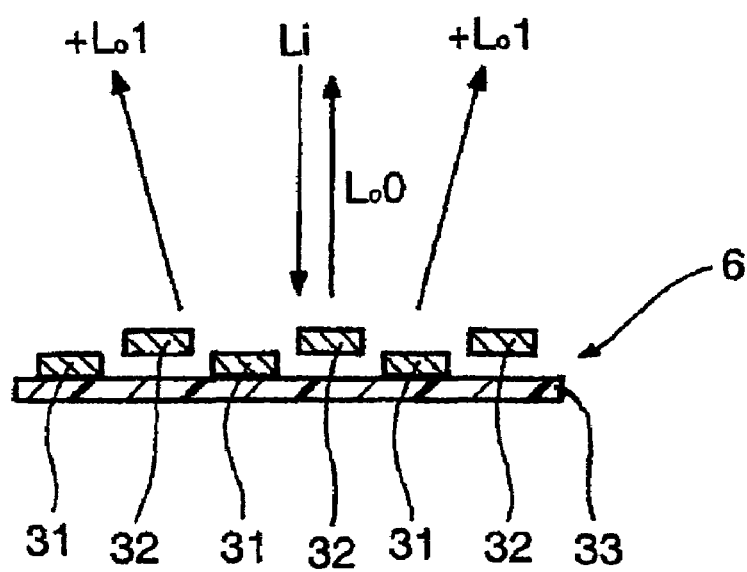

The GLV 6 is a reflective spatial modulator including a number of strip-shaped minute ribbons (also referred to as membranes) 31, 32, 31, 32, . . . with air gaps defined therebetween, juxtaposed on a substrate 33 (see FIGS. 3A and 3B). A set of six of the ribbons 31, 32, 31, 32, . . . makes up one pixel. A number of, e.g., 1080 pixels, are disposed in the direction in which the linear beams shaped by the line generator/expander optical system 4 extend. The GLV 6 has a linear shape in its entirety having a longitudinal dimension of 28 mm and a transverse dimension (the length of the ribbons) of 200 μm. Each of the ribbons 31, 32 has a width in the range from 3 to 4 μm, and is fabricated on the substrate 33 by a silicon process. The GLV 6 has several thousand, e.g., 6480, ribbons 31, 32, . . . arrayed in the longitudinal direction of the GLV 6 transversely across the ribbons 31, 32, . . . .

The GLV 6 has interconnections and an electric circuit arranged for applying a common voltage to every other ribbons, i.e., three ribbons 31, 31, 31, of the six ribbons 31, 32, 31, 32, 31, 32 that make up one pixel. When no voltage is applied (Pixel Off), the six ribbons 31, 32, 31, 32, 31, 32 have their surfaces positioned within one plane and act as plane reflecting mirrors, reflecting incident light Li (see FIG. 3A).

On the other hand, when the voltage is applied (Pixel On), the ribbons 31, 31, 31 are displaced toward the substrate 33 under electrostatic forces, and the ribbons 31, 32, 31, 32, 31, 32 have their respective surfaces providing minute alternate concave and convex successive facets, and function as a diffraction grating, separating reflected light Lo into a mirror-reflected component (0th-order light) Lo1 and a diffracted component (±first-order diffracted light) ±Lo1 (see FIG. 3B). When the ribbons 31, 31, 31 are displaced a distance which is ¼ of the wavelength of the incident light Li, the ±first-order diffracted light ±Lo1 has a maximum intensity.

The light beams "+Lo1, Lo0, −Lo1" in FIG. 3B represent diffracted light produced by the GLV 6, "+Lo1" indicating +first-order diffracted light, "Lo0" 0th-order (diffracted) light, and "−Lo1" −first-order diffracted light.

For forming an image with the GLV 6, the ribbons 31, 31, 31 are driven by an image signal to block the 0th-order light Lo0 separated by the GLV 6 and extract only the ±first-order diffracted light ±Lo1, thereby performing an intensity modulation for each pixel. That is, the GLV 6 functions as a first-order spatial modulator.

For selecting only the first-order diffracted light ±Lo1, the Schlieren filter 8 is provided for performing spatial filtering (Schlieren filtering) on the Fourier plane of the GLV 6.

The Schlieren filter 8 is disposed in the vicinity of a one-dimensional image focused by the relay optical system 7, i.e., in the position of the pupil of the relay optical system 7. This is because the ±first-order diffracted light ±Lo1 and light reflected/diffracted in other directions are to be separated with as high contrast as possible, and the position where those lights are spatially separately most from each other is the position of the pupil (see FIG. 1).

The relay optical system 7 may be of the projection type as shown in FIG. 1, or may be of the reflection type such as a so-called Offner relay system.

Figure 4:
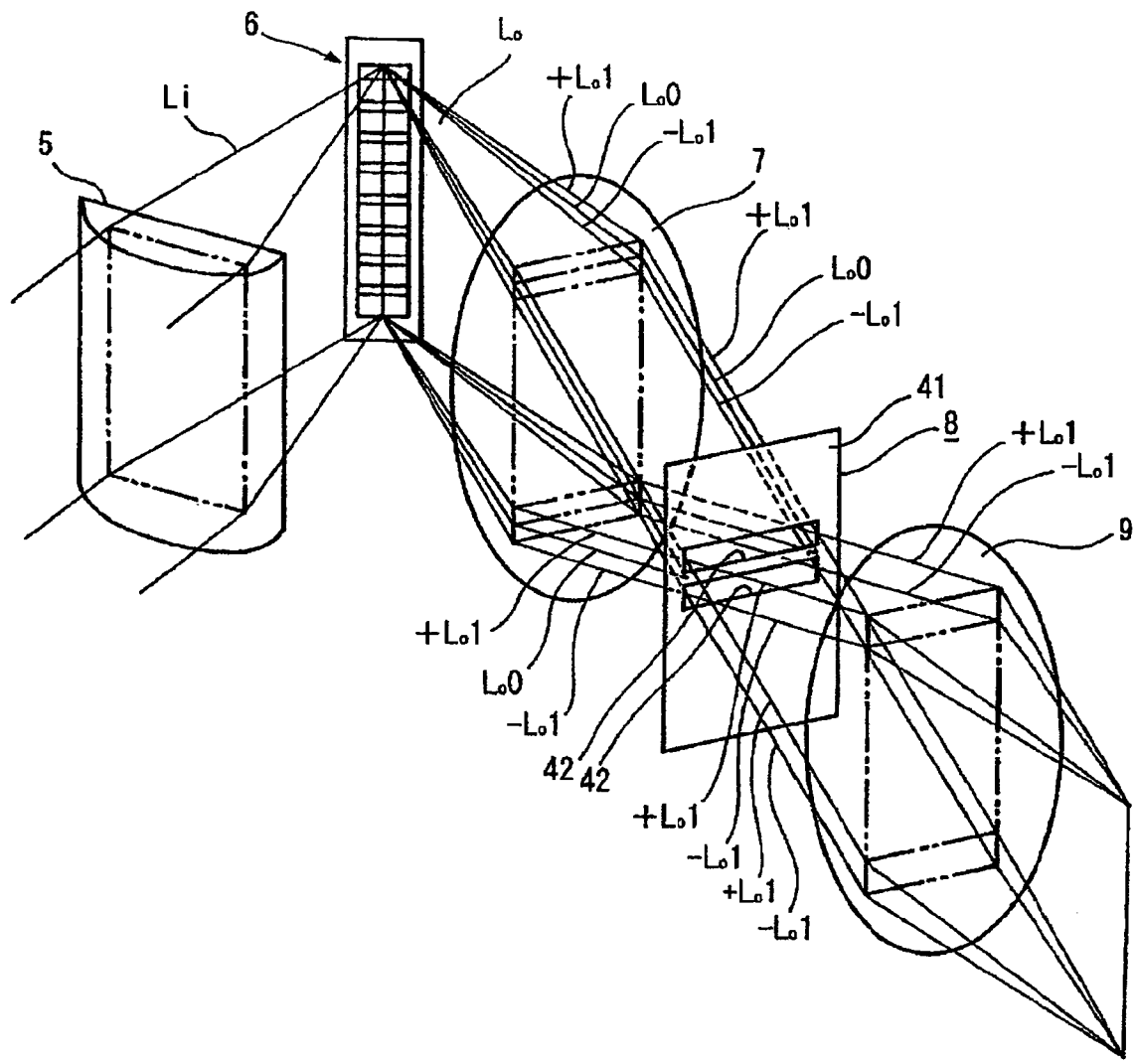
FIG. 4 is a schematic perspective view showing an optical relation between a grating light valve and a Schlieren filter.

FIG. 4 shows essential parts of a Schlieren filter optical system. In FIG. 4, a light beam from a light source, not shown, is focused by a focusing lens 5 onto a GLV 6, which transmits diffracted light through a relay optical system 7, a Schlieren filter 8, and a projection lens system 9 successively in the order named.

The Schlieren filter 8 may be a Schlieren filter for transmitting only ±first-order diffracted light ±Lo1 (hereinafter referred to as "transmissive Schlieren filter") or a Schlieren filter for reflecting only ±first-order diffracted light ±Lo1 (hereinafter referred to as "reflective Schlieren filter"). The term "transmission" also includes simple "passage" here and below.

The transmissive Schlieren filter includes a shield plate with an opening or a transmission area formed therein for transmitting ±first-order diffracted light ±Lo1. The reflective Schlieren filter includes a shield plate with a reflection area formed therein for reflecting ±first-order diffracted light ±Lo1.

The transmissive Schlieren filter 8 will be described by way of example below (see FIG. 4).

The transmissive Schlieren filter 8 has a shield plate 41 with two rectangular openings 42, 42 defined therein at spaced positions. The openings 42, 42 are of a size for transmitting only ±first-order diffracted light ±Lo1 therethrough and blocking 0th-order light Lo0, thereby filtering only ±first-order diffracted light ±Lo1 (see FIG. 4).

For displaying a full-color two-dimensional image using the GLV 6 and the Schlieren filter 8, it is necessary to use laser beams L in three colors, e.g., R (red), G (green), and B (blue), to irradiate respective corresponding three GLVs (spatial modulators) 6, 6, 6. The laser beams L that are modulated respectively by the three GLVs 6, 6, 6 are combined to display a full-color two-dimensional image.

By controlling the GLV 6 with an image signal, the ±first-order diffracted light ±Lo1 is modulated to achieve continuous gradations for producing a one-dimensional image (see FIG. 4).

The one-dimensional image is enlarged and projected by the projection lens system 9 (see FIG. 1).

The one-dimensional image that is enlarged by the projection lens system 9 is scanned by the galvanometer mirror 10 in a direction perpendicular to the direction of the one-dimensional image to display a two-dimensional image on the screen 11 (see FIG. 1).

Drive control means for the GLV 6 and the galvanometer mirror 10 will be omitted from illustration and description. In the above embodiment, the galvanometer mirror 10 is illustrated as means for converting a one-dimensional image into a two-dimensional image. However, the means for converting a one-dimensional image into a two-dimensional image is not limited to the galvanometer mirror, but may be another mechanical optical scanner such as a polygon mirror or the like.

In the image display apparatus 1, the multiple reflection plate 23 separates the intensity of the laser beam L into five emitted light beams lt_n each with an optical path difference equal to or greater than the coherence length (60 mm), thus making the emitted light beams lt_n uncorrelated from each other. As a result, speckle noise can be reduced.

When the GLV 6 is irradiated with the five separated laser beams L, the optical axis angles of the laser beams L are different from each other, producing different speckle patterns for thereby further reducing speckle noise.

In the above image display apparatus 1, the separating optical system 3 is constructed of a single optical component with the total reflection surface 21 and the semi-transmissive reflection surface 22 disposed on the single parallel flat plate 20. Therefore, the number of parts used does not need to be considerably large, and the dimensional accuracy and positional accuracy can be higher than if a plurality of optical components were combined together.

Figure 5:
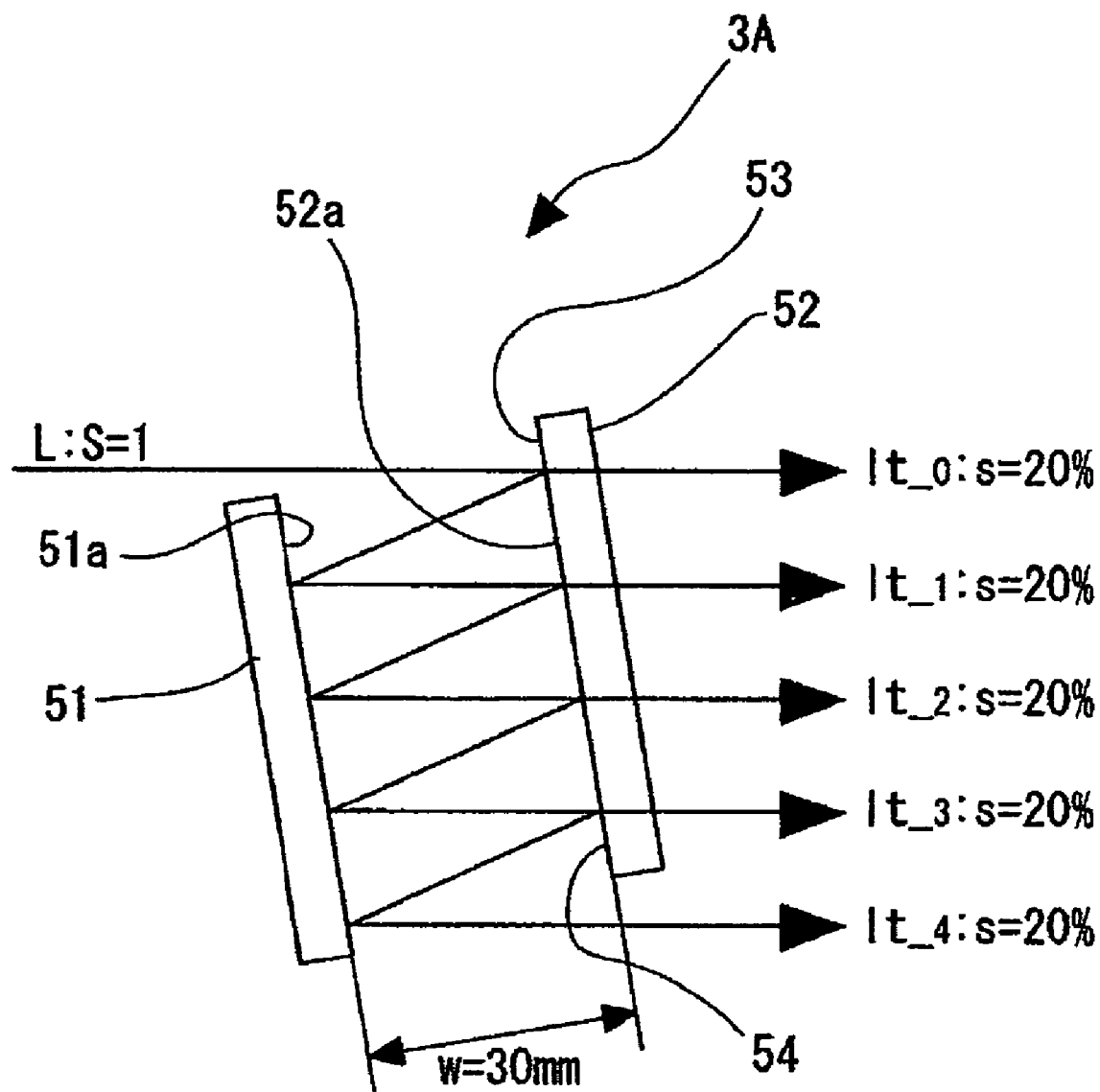
FIG. 5 is a cross-sectional view showing a separating optical system at an enlarged scale according to a second embodiment of the present invention.

FIG. 5 shows a second embodiment of an illuminating optical device in an image display apparatus according to the present invention. The illuminating optical device in the image display apparatus according to the second embodiment differs from the illuminating optical device in the image display apparatus according to the first embodiment as to a different arrangement of a separating optical system.

A separating optical system 3A according to the second embodiment includes a single total reflection mirror 51 and a single half-silvered mirror 52 having a semi-transmissive reflection surface 52a disposed in confronting relation to a total reflection surface 51a of the total reflection mirror 51. The total reflection surface 51a of the total reflection mirror 51 and the semi-transmissive reflection surface 52a of the half-silvered mirror 52 are disposed parallel to each other.

The total reflection mirror 51 is positioned closer to the laser beam source 2 than the half-silvered mirror 52.

The total reflection mirror 51 and the half-silvered mirror 52 are displaced in their planes with respect to each other. The half-silvered mirror 52 has an end (hereinafter referred to as "entrance end") 53 positioned on the optical axis of the laser beam L.

The total reflection mirror 51 and the half-silvered mirror 52 are slightly tilted from an orientation in which they would be perpendicular to the optical axis of the laser beam L. The total reflection mirror 51 and the half-silvered mirror 52 are tilted such that an end (hereinafter referred to as "exit end") 54 of the half-silvered mirror 52 which is opposite to the entrance end 53 is displaced slightly farther from the laser beam source 2 than the entrance end 53 (see FIG. 5).

The total reflection surface 51a of the total reflection mirror 51 and the semi-transmissive reflection surface 52a of the half-silvered mirror 52 are spaced from each other by a distance w which is equal to or greater than ½, for example, of the coherence length (60 mm) of the laser beam L applied thereto, i.e., 60×½=30 mm (see FIG. 5).

To the total reflection mirror 51, there is applied a total reflection film having a reflectance of 100%, providing the total reflection surface 51a. To the half-silvered mirror 52, a semi-transmissive reflection film is applied, providing the semi-transmissive reflection surface 52a. Although not described in detail, the semi-transmissive reflection surface 52a of the half-silvered mirror 52 is divided into a plurality of (five in the present embodiment) regions, as with the semi-transmissive reflection surface 22 according to the first embodiment. The semi-transmissive reflection surface 52a has transmittances arranged in the same manner as with the transmittances of the regions in the first embodiment.

The laser beam L that is applied to the separating optical system 3A according to the second embodiment is first applied to the semi-transmissive reflection surface 52a. The semi-transmissive reflection surface 52a passes 20% of the intensity of the laser beam L, and reflects the remaining 80% toward the total reflection surface 51a (see FIG. 5).

The total reflection surface 51a reflects 100% of the laser beam L toward the semi-transmissive reflection surface 52a (see FIG. 5).

The laser beam L which is reflected by the total reflection surface 51a is applied again to the semi-transmissive reflection surface 52a. The portion of the semi-transmissive reflection surface 52a to which the laser beam L is applied passes 33% of the intensity of the applied laser beam L, and reflects the remaining 66% toward the total reflection surface 51a (see FIG. 5).

The emitted light beam l that has passed through the above portion of the semi-transmissive reflection surface 52a has its intensity corresponding to approximately 20% of the intensity of the laser beam L which is applied to the separating optical system 3A (see FIG. 5).

Subsequently, the laser beam L applied to the separating optical system 3A is repeatedly reflected between the semi-transmissive reflection surface 52a and the total reflection surface 51a, and partly passes through and is emitted from the semi-transmissive reflection surface 52a, so that the laser beam L is divided into five emitted light beams l, l, . . . having the same intensity (see FIG. 5).

Between the light beams l, l, . . . emitted after the laser beam L is reflected between the total reflection surface 51a and the semi-transmissive reflection surface 52a, there are developed optical path differences each at least twice the distance between the total reflection surface 51a and the semi-transmissive reflection surface 52a (see FIG. 5).

In this manner, there is developed an optical path difference equal to or greater than the coherence length of the laser beam L between the emitted light beams l, l. Consequently, the five emitted light beams l, l, . . . are not coherent with respect to each other. Applying the emitted light beams each having an optical path difference equal to or greater than the coherence length of the laser beam L is equivalent to applying light beams from five uncorrelated light sources, with the result that speckle noise can be reduced.

When the five divided laser beams L are applied to the GLV 6, they fall on the GLV 6 at different optical axis angles, producing different speckle patterns for thereby further reducing speckle noise.

Figure 6:
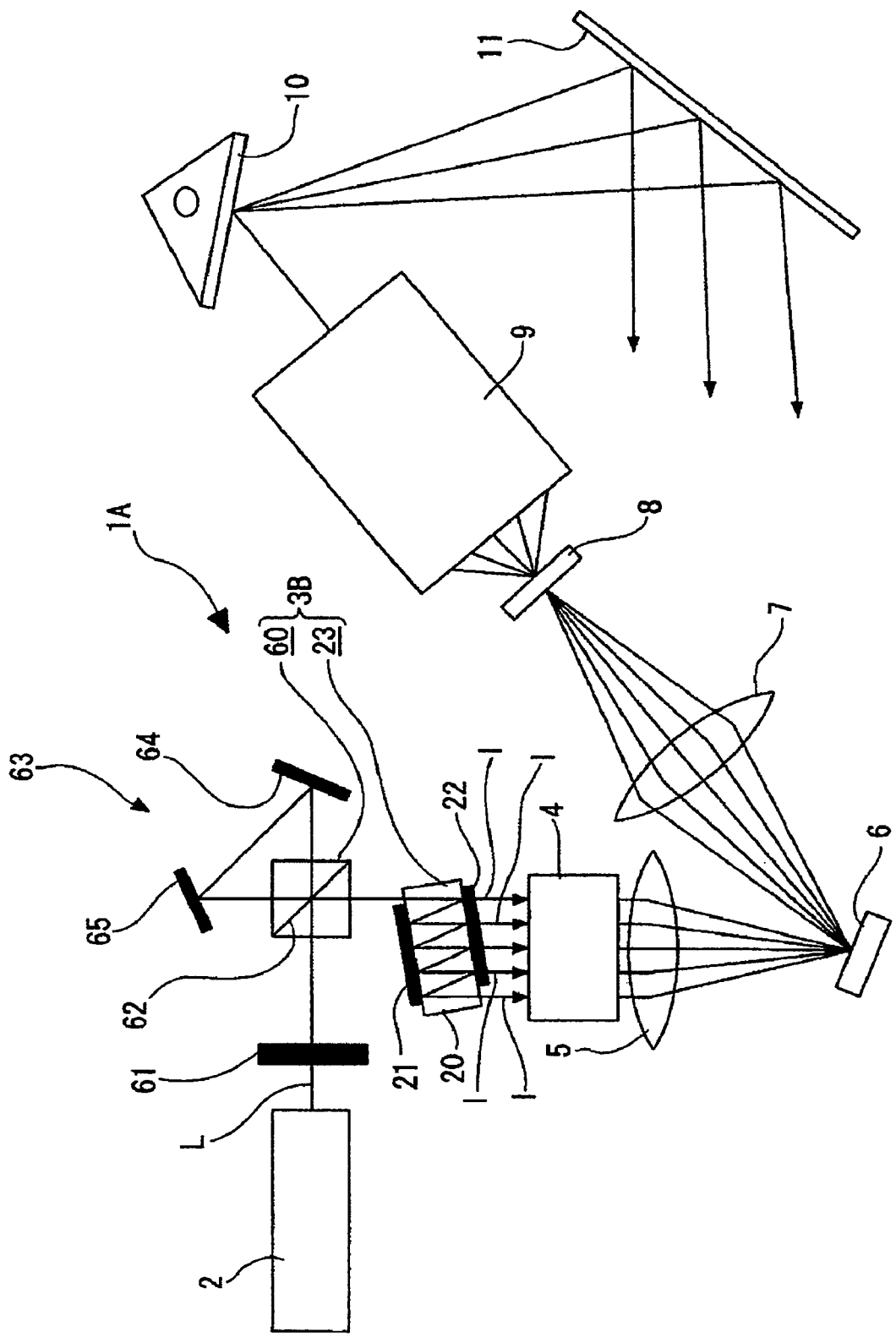
FIG. 6 shows, together with FIG. 7, a third embodiment of the present invention, FIG. 6 being a schematic view showing an image display apparatus in its entirety.
Figure 7:
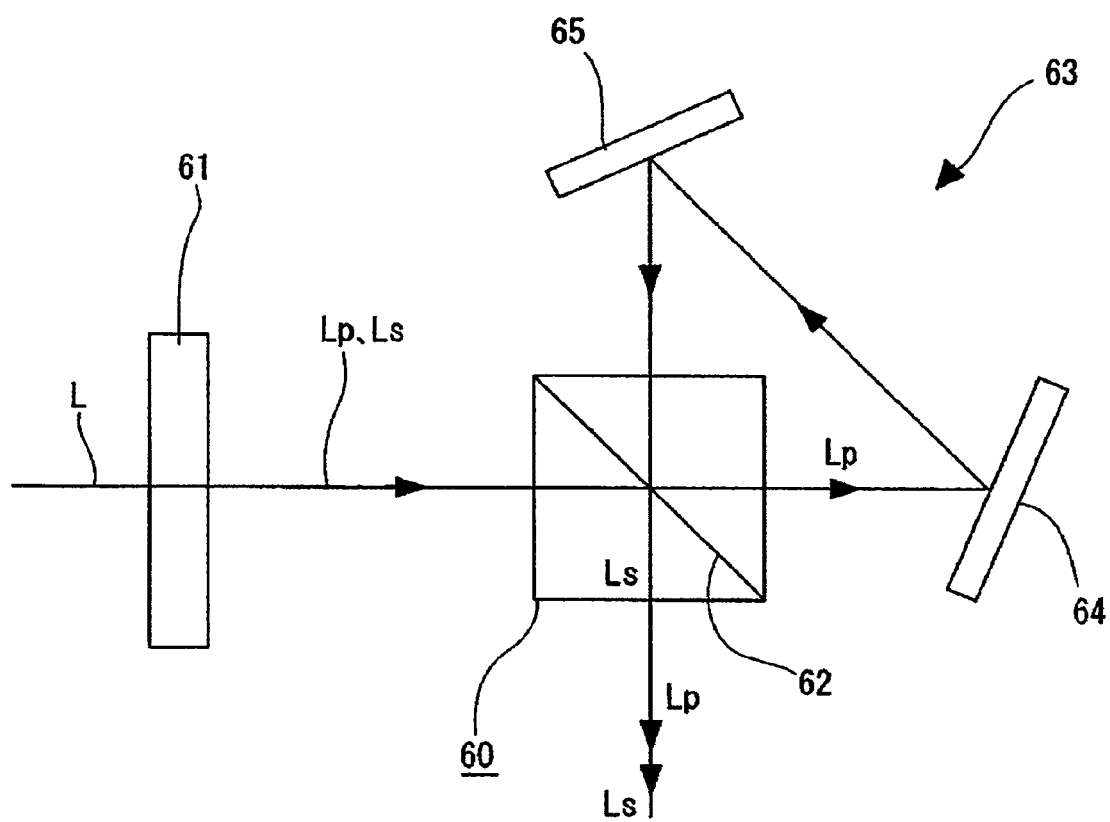
FIG. 7 is a schematic view showing polarizing separating means at an enlarged scale.

FIGS. 6 and 7 show a third embodiment of an image display apparatus according to the present invention. The image display apparatus according to the third embodiment differs from the image display apparatus according to the first embodiment in that polarizing separating means 60 is added to the separating optical system 3.

The polarizing separating means 60 of the image display apparatus 1A according to the third embodiment will be described below. Those parts of the image display apparatus 1A according to the third embodiment which are identical to those of the image display apparatus 1 according to the first embodiment are denoted by identical reference characters, and will not be described below.

A separating optical system 3B includes the multiple reflection plate 23 and the polarizing separating means 60 (see FIG. 6).

The multiple reflection plate 23 is of an arrangement that is identical to the multiple reflection plate according to the first embodiment.

The polarizing separating means 60 includes a polarization rotator 61 for separating a laser beam L into a P-polarized component Lp and an S-polarized component Ls, a polarization separator 62 for separating the P-polarized component Lp and the S-polarized component Ls spatially from each other, and an optical path difference generator 63 for developing an optical path difference between the P-polarized component Lp and the S-polarized component Ls (see FIG. 6).

The polarization rotator 61 includes a λ/2-wavelenth plate, for example, which may be a quartz crystal wavelength plate, a Fresnel rhomb wavelength plate, or the like. If the laser beam L emitted from the laser beam source 2 has already been separated into the P-polarized component Lp and the S-polarized component Ls, then the polarization rotator 61 should be contained in the laser beam source 2.

The polarization separator 62 is disposed behind the polarization rotator 61, and includes a polarization beam splitter in the form of a flat plate (see FIGS. 6 and 7).

The polarization beam splitter 62 is disposed at a tilt angle of 45° with respect to the optical axis. The P-polarized component Lp passes substantially straight through the polarization beam splitter 62, and the S-polarized component Ls is reflected by the polarization beam splitter 62 in a direction substantially perpendicular to the P-polarized component Lp (see FIG. 7).

The optical path difference generator 63 is disposed behind the polarization beam splitter 62 on a side thereof where the P-polarized component Lp travels, and includes two total reflection mirrors 64, 65 (see FIG. 7).

The first total reflection mirror 64 is disposed to reflect the P-polarized component Lp that has passed through the polarization beam splitter 62, at an angle of the incident angle 45°/2=22.5° (see FIG. 7).

The second total reflection mirror 65 is disposed to reflect the P-polarized component Lp that has been reflected by the first total reflection mirror 64, at an angle of the incident angle 45°/2=22.5°, and to return the reflected P-polarized component Lp to the polarization beam splitter 62 at the incident position thereon (see FIG. 7).

The two total reflection mirrors 64, 65 are disposed in such a positional relation that the P-polarized component Lp which has passed through the optical path difference generator 63 has an optical path length longer than the coherence length (60 mm) of the laser beam L (see FIG. 7).

The P-polarized component Lp which has passed through the optical path difference generator 63 is transmitted again through the polarization beam splitter 62, and is combined with the S-polarized component Ls.

The laser beam L, which has been separated into the P-polarized component Lp and the S-polarized component Ls and the combined with the optical path difference developed therebetween which is equal to or greater than the coherence length, is applied to the multiple reflection plate 23, which separates the laser beam L into a plurality of laser beams l, l, . . . that are then applied to the GLV 6.

Since the polarizing separating means 60 according to the third embodiment separates the laser beam L into the P-polarized component Lp and the S-polarized component Ls with the optical path difference developed therebetween which is longer than the coherence length of the laser beam L, further different speckle patterns are generated for thereby further reducing speckle noise.

In each of the embodiments, the GLV is employed as the spatial modulator. However, the present invention is not limited such an arrangement, but the spatial modulator may be another one-dimensional spatial modulator. According to the present invention, moreover, the spatial modulator is not limited to a one-dimensional spatial modulator, but may be a two-dimensional spatial modulator such as a liquid crystal or the like.

In each of the above embodiments, a laser beam emitted from a single laser beam source is separated into a plurality of laser beams. However, the present invention is not limited such an arrangement, but each of a plurality of laser beams emitted from a plurality of laser beam sources may be separated into a plurality of laser beams.

Furthermore, specific shapes and structures of various components in each of the above embodiments are illustrated by way of specific example only in embodying the present invention, and should not limit the interpretation of the technical range of the present invention.

INDUSTRIAL APPLICABILITY

As is apparent from the foregoing description, an illuminating optical device in an image display apparatus according to the present invention, which applies a laser beam to a spatial modulator and modulates the laser beam based on an image signal input to the spatial modulator to display an image, is characterized in that a plurality of laser beams each having an optical path difference greater than the coherence length of the laser beam are applied to the spatial modulator.

An image display apparatus according to the present invention, which applies a laser beam to a spatial modulator and modulates the laser beam based on an image signal input to the spatial modulator to display an image, is characterized in that an illuminating optical device for applying a laser beam to the spatial modulator applies a plurality of laser beams each having an optical path difference greater than the coherence length of the laser beam to the spatial modulator.

According to the present invention, therefore, since a plurality of laser beams each having an optical path difference greater than the coherence length of the laser beam are applied to the spatial modulator, different speckle patterns are generated for thereby reducing speckle noise.

In inventions described in claims 2 and 10, there is provided a multiple reflection plate including a parallel flat plate which has confronting parallel surfaces with a total reflection surface formed on one of the confronting parallel surfaces and a semi-transmissive reflection surface having a predetermined transmittance formed on the other of the confronting parallel surfaces, the arrangement being such that a laser beam is introduced into the multiple reflection plate at a predetermined incident angle from an entrance window which is formed by removing a portion of the total reflection surface, undergoes multiple reflections in the multiple reflection plate, and is partly emitted successively from the semi-transmissive reflection surface. A component for separating a single laser beam into a plurality of laser beams may be constructed of a single optical component. Therefore, the number of parts used does not need to be considerably large, and the dimensional accuracy and positional accuracy can be higher than if a plurality of optical components were combined together.

In inventions described in claims 3, 4, 11, and 12, since the laser beams are applied to the spatial modulators at different optical axis angles, these laser beams generate different speckle patterns for further reducing speckle noise.

In inventions described in claims 5 through 8 and 13 through 16, since the spatial modulator includes a grating light valve, it is possible to display seamless, clear, and bright images. As the grating light valve can be manufactured inexpensively by the micromachining technology, the cost of the image display apparatus can be lowered.

The invention claimed is:

1. An apparatus for improving quality of an image display by reducing laser speckle effects through reducing coherence of a laser, the apparatus comprising:
   a reflective spatial light modulator configured to have an image signal input;
   an optical component configured to introduce an optical path difference between a plurality of laser beams originating from a laser beam that is greater than or equal to a coherence length of the laser beam, the optical component comprising:
      a polarizing separator configured to accept a polarized laser beam comprising a first polarized component and a second polarized component and spatially separate the first polarized component of the polarized laser beam from the second polarized component of the polarized laser beam by directing the first polarized component and the second polarized component in different respective first and second directions;
      an optical path difference generator configured to accept the first polarized component from the polarizing separator and delay the first polarized component with respect to the second polarized component to develop a first optical path difference between the first polarized component and the second polarized component, the first optical path difference being greater than a coherence length of the polarized laser beam, wherein the first optical path difference is developed by directing the first polarized component through a series of mirrors and back toward the polarizing separator;
      wherein the polarizing separator is further configured to combine the first and second polarized components with the first optical path difference therebetween to form a low coherence laser beam; and
      parallel reflection surfaces configured to accept the low coherence laser beam and generate the plurality of laser beams from the low coherence laser beam, at least some of the plurality of laser beams being delayed by the parallel reflection surfaces to introduce a second optical path difference between each of the plurality of laser beams, the second optical path difference being greater than the coherence length of the polarized laser beam; and
   a deflecting optical component configured to direct the plurality of laser beams to the reflective spatial light modulator such that the plurality of laser beams converge and focus on the reflective spatial light modulator at different angles as viewed from a perspective along the longitudinal direction of the spatial light modulator, the first optical path difference and the second optical path difference serving to reduce the coherence of the plurality of laser beams.

2. The image display apparatus according to claim 1, wherein the parallel reflection surfaces comprise a total reflection surface formed on one of the parallel reflection surfaces and a semi-transmissive reflection surface having a predetermined transmittance formed on the other of the parallel reflection surfaces, the arrangement being such that the low coherence laser beam is introduced into the multiple reflection plate at a predetermined incident angle from an entrance window which is formed by removing a portion of the total reflection surface, wherein the low coherence laser beam undergoes multiple reflections and is partly emitted from the semi-transmissive reflection surface, so that the low coherence laser beam is separated into the plurality of laser beams.

3. The image display apparatus according to claim 2, wherein the reflective spatial light modulator comprises a grating light valve.

4. The image display apparatus according to claim 1, wherein the reflective spatial light modulator comprises a grating light valve.

5. The image display apparatus according to claim 1, wherein the reflective spatial light modulator comprises a grating light valve.

6. The image display apparatus of claim 1, further comprising:
a line generator component configured to shape the plurality of laser beams to have linear beam configurations.

7. The image display apparatus of claim 1, wherein the polarizing separator comprises a polarization beam splitter, the polarization beam splitter being adapted to reflect the first polarized component in a first direction and reflect the second polarized component in a second direction, the first direction being perpendicular to the second direction.

8. The image display apparatus of claim 1, wherein the polarization rotator separates the laser beam into a P-polarized component and an S-polarized component.

9. The apparatus of claim 1, further comprising:
a line generator optical system to accept the plurality of laser beams from the parallel reflection surfaces and make uniform the intensity of each of the plurality of laser beams and output the uniform plurality of laser beams to the deflecting optical component.

10. A method for improving quality of an image display by reducing laser speckle effects through reducing coherence of a laser, the method comprising acts of:
introducing an optical path difference between a plurality of laser beams originating from a laser beam, the optical path difference being greater than or equal to a coherence length of the laser beam, wherein introducing the optical path difference comprises acts of:
directing a first polarized component and a second polarized component of a polarized laser beam in different respective first and second directions to spatially separate the first polarized component of the polarized laser from the second polarized component of the laser beam;
developing a first optical path difference between the first polarized component and the second polarized component of the polarized laser beam, the first optical path difference being greater than a coherence length of the polarized laser beam, wherein developing the first optical path difference comprises directing the first polarized component through a series of mirrors and back toward the polarizing separator to delay the first polarized component with respect to the second polarized component;
combining the first and second polarized components with the first optical path difference therebetween to form a low coherence laser beam; and
separating the low coherence laser beam into the plurality of laser beams by parallel reflection surfaces, at least some of the plurality of laser beams being delayed to introduce a second optical path difference between each of the plurality of laser beams, the second optical path difference being greater than the coherence length of the polarized laser beam; and
directing the plurality of laser beams to a reflective spatial light modulator such that the plurality of laser beams converge on the reflective spatial light modulator, the first optical path difference and the second optical path difference serving to reduce the coherence of the plurality of laser beams.

11. The method according to claim 10, wherein the act of separating the low coherence laser beam into the plurality of laser beams is performed by parallel reflection surfaces with a total reflection surface formed on one of the parallel reflection surfaces and a semi-transmissive reflection surface having a predetermined transmittance formed on the other of the parallel reflection surfaces, the arrangement being such that the laser beam is introduced into the multiple reflection plate at a predetermined incident angle from an entrance window which is formed by removing a portion of the total reflection surface, wherein the low coherence laser beam undergoes multiple reflections and is partly emitted from the semi-transmissive reflection surface, so that the low coherence laser beam is separated into the plurality of laser beams.

12. The method according to claim 11, wherein the reflective spatial light modulator comprises a grating light valve.

13. The method according to claim 10, wherein the reflective spatial light modulator comprises a grating light valve.

14. The method according to claim 10, wherein the reflective spatial light modulator comprises a grating light valve.

15. The method of claim 10, further comprising an act of: shaping the plurality of laser beams to have linear beam configurations.

16. The method of claim 10, wherein spatially separating the first polarized component and the second polarized component comprises reflecting the first polarized component in a first direction and reflecting the second polarized component in a second direction, the first direction being perpendicular to the second direction.

17. The method of claim 10, wherein first polarized component and the second polarized component comprise a P-polarized component and an S-polarized component.

18. The method of claim 10, further comprising:
making uniform the intensities of each of the plurality of laser beams prior to directing the plurality of laser beams to the reflective spatial light modulator.

* * * * *

UNITED STATES PATENT AND TRADEMARK OFFICE
CERTIFICATE OF CORRECTION

PATENT NO. : 7,433,126 B2 Page 1 of 1
APPLICATION NO. : 10/489152
DATED : October 7, 2008
INVENTOR(S) : Shigeki Hashimoto et al.

It is certified that error appears in the above-identified patent and that said Letters Patent is hereby corrected as shown below:

ON THE TITLE PAGE, item (54), the title:

"ILLUMINATING OPTICAL DEVICE IN IMAGE DISPLAY DEVICE AND IMAGE DISPLAY DEVICE" SHOULD READ -- ILLUMINATING OPTICAL DEVICE IN IMAGE DISPLAY APPARATUS AND IMAGE DISPLAY APPARATUS --.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,433,126 B2
APPLICATION NO. : 10/489152
DATED : October 7, 2008
INVENTOR(S) : Shigeki Hashimoto et al.

It is certified that error appears in the above-identified patent and that said Letters Patent is hereby corrected as shown below:

ON THE TITLE PAGE, item (54) and Column 1, lines 1-3, the title:

"ILLUMINATING OPTICAL DEVICE IN IMAGE DISPLAY DEVICE AND IMAGE DISPLAY DEVICE" SHOULD READ -- ILLUMINATING OPTICAL DEVICE IN IMAGE DISPLAY APPARATUS AND IMAGE DISPLAY APPARATUS --.

This certificate supersedes the Certificate of Correction issued March 10, 2009.

Signed and Sealed this

Thirty-first Day of March, 2009

JOHN DOLL
*Acting Director of the United States Patent and Trademark Office*